United States Patent [19]

Boller

[11] Patent Number: 5,567,057
[45] Date of Patent: Oct. 22, 1996

[54] TILTING PAD THRUST BEARING ASSEMBLY

[76] Inventor: C. William Boller, 1380 Gordon Dr., Naples, Fla. 33940

[21] Appl. No.: 536,632

[22] Filed: Sep. 29, 1995

[51] Int. Cl.$^6$ .................................................. F16C 17/06
[52] U.S. Cl. .......................... 384/122; 384/307; 384/308
[58] Field of Search .................................. 384/122, 306, 384/307, 308, 121

[56] References Cited

U.S. PATENT DOCUMENTS

| | | | |
|---|---|---|---|
| 4,026,613 | 5/1977 | Moravchik | 384/308 |
| 4,403,873 | 9/1983 | Gardner . | |
| 4,501,505 | 2/1985 | Chambers . | |
| 5,046,864 | 9/1991 | Boller | 384/308 |

*Primary Examiner*—Lenard A. Footland
*Attorney, Agent, or Firm*—Merrill N. Johnson

[57] ABSTRACT

An equalizing tilting pad thrust bearing assembly with inner and outer concentric retaining rings supporting an array of upper and lower equalizing links which support a circular array of tilting bearing pads. Each tilting pad has a flat bottom surface supported by a raised radial cylindrical surface on the upper side of an upper equalizing link. The pads tilt circumferentially to develop a hydrodynamic lubricating wedge by rolling on the radius of the raised cylindrical surface of an upper equalizing link. Each bearing pad and its supporting upper equalizing link tilt together radially by rolling on the radius of two slightly crowned radial cylinders on the bottom surface of the upper link. Each upper link pivots circumferentially about a stub radial pin extending inward from the outer retaining ring which engages an axial slot in the upper link. Each lower equalizing link is supported by and pivots circumferentially about a radial pin whose opposite ends are fixed in the inner and outer retaining rings. The axes of the upper and lower link pivot pins and the interconnecting contact points all lie in a common plane when the equalizing links are in a position of zero pivoting angle. The inner and outer retaining rings are concentricly connected by radial spokes that serve as pad separators and direct fresh oil into the hydrodynamic oil film by means of grooves in the spokes.

3 Claims, 3 Drawing Sheets

TILTING PAD THRUST BEARING ASSEMBLY

FIELD OF INVENTION

This invention relates to tilting pad thrust bearings used extensively to transfer the axial loads of rotating shafts to stationary housings. More particularly, my invention relates to an improved form of the tilting pad assembly of the thrust bearing.

BACKGROUND OF THE INVENTION

Tilting pad thrust bearings are used to support the collar attached to a rotating shaft. The collar has a planar surface perpendicular to the rotating shaft which transmits the axial load from the rotating shaft by hydrodynamic oil pressure developed in an oil film between the collar and an array of individual tilting pads. The pads are supported by upper and lower equalizing links which are in turn supported by a retaining ring which transmits the thrust load to a stationary machine housing.

Tilting pad thrust bearings have been in use for many years and particular variations in the form of the tilting pad thrust bearing have been proposed and patented including U.S. Pat. Nos. 4,403,873 and 4,501,505 and my own U.S. Pat. No. 5,046,864 issued Sep. 10, 1991.

The tilting pad thrust bearings described and claimed in my U.S. Pat. No. 5,046,864 improved equalization of the thrust load amongst the pads by reducing the sliding friction generated by prior thrust bearing arrangements. This was achieved by having the axes of the upper equalizing link and the lower equalizing link pivot pins and interconnecting contact points all lie in a common plane when the links are in a position of zero pivoting angle.

SUMMARY OF THE INVENTION

Since issuance of U.S. Pat. No. 5,046,864 I have continued to experiment with designs which would reduce operating temperature, friction power losses and the operating rate of oil flow and also increase the load carrying capacity of the thrust bearing.

Most tilting pad thrust bearings tilt in both circumferential and radial directions to allow hydrodynamic forces to move the bearing pads into the optimum tilt angle which varies with load distribution and rate of shaft and collar rotation. Most thrust bearing designs which allow both cylindrical and radial tilting use bearing pad supports with a spherical or sharply radiused surface to contact its supporting member. This design concentrates the bearing pad support forces at a point, resulting in considerable undesirable deflection of the pad's planar bearing surface.

In my improved assembly the bearing pads have a flat bottom surface which rides on a raised radial cylindrical surface on the upper side of the upper equalizing link. With this construction, deflections of the pad will be markedly reduced because the pad supporting force is distributed along a contact surface of considerable length. My construction enables the pad to be used for centered or offset pad support by simply shifting the location of the upper and lower link pivot points in the retaining rings.

In my improved thrust bearing assembly, the pads tilt circumferentially by rolling on the radius of the raised cylindrical surface of the upper equalizing link. The pad and upper link tilt together radially by rolling on the radius of two slightly crowned radial cylinders on opposite sides of the upper link.

The spherical ball used to support the upper link used in my U.S. Pat. No. 5,046,864 has been replaced by a stub pin which extends radially from the inner wall of the outer retaining ring to engage an axial slot in the upper link. In my prior patent, the retaining ring had to have a bulky bottom section to properly support the array of spherical balls. This bulky bottom portion of the retaining ring has been eliminated by use of this stub pin, resulting in reduced weight and the axial space required for installation of the bearing assembly.

The lower equalizing links are arranged in a circular array beneath the upper equalizing links and each lower link is pivotally mounted on a radial pivot pin whose opposite ends are fixed in the inner and outer rings of the retaining ring. Each lower link has a pair of flat upwardly facing surfaces on its opposite ends which lie in the same plane as the axis of its radial pivot pin hole. The lower link's upwardly facing flat surfaces support adjacent upper equalizing links at the high point of the slightly crowned cylindrical surfaces on the lower side of the upper link.

This construction allows each upper link to tilt radially by rolling on the radius of the crowned cylinder. Since each upper link and its supported bearing pad move together in radial tilting, the pad can tilt radially to compensate for any misalignment between the rotating collar and the bearing assembly to allow for any hydrodynamic force related to the radial tilting.

Some conventional tilting pad thrust bearing assemblies use various methods of introducing a supply of fresh oil directly into hydrodynamic oil film. My improved assembly introduces fresh oil directly into the oil film by means of grooves in the upper surface of the array of radial spokes between the tilting pads. The supply of fresh oil reduces pad operating temperature, reduces friction power loss and reduces the operating oil flow rate while raising load carrying capacity.

While my improved bearing assembly preferably uses grooves in my unique radial spokes to introduce fresh oil into the oil film, the foregoing benefits of fresh oil can also be achieved in my improved bearing assembly by using conventional means such as shown in Chambers U.S. Pat. No. 4,501,505.

DETAILED DESCRIPTION OF THE PREFERRED EMBODIMENT

Figures 1, 1A:
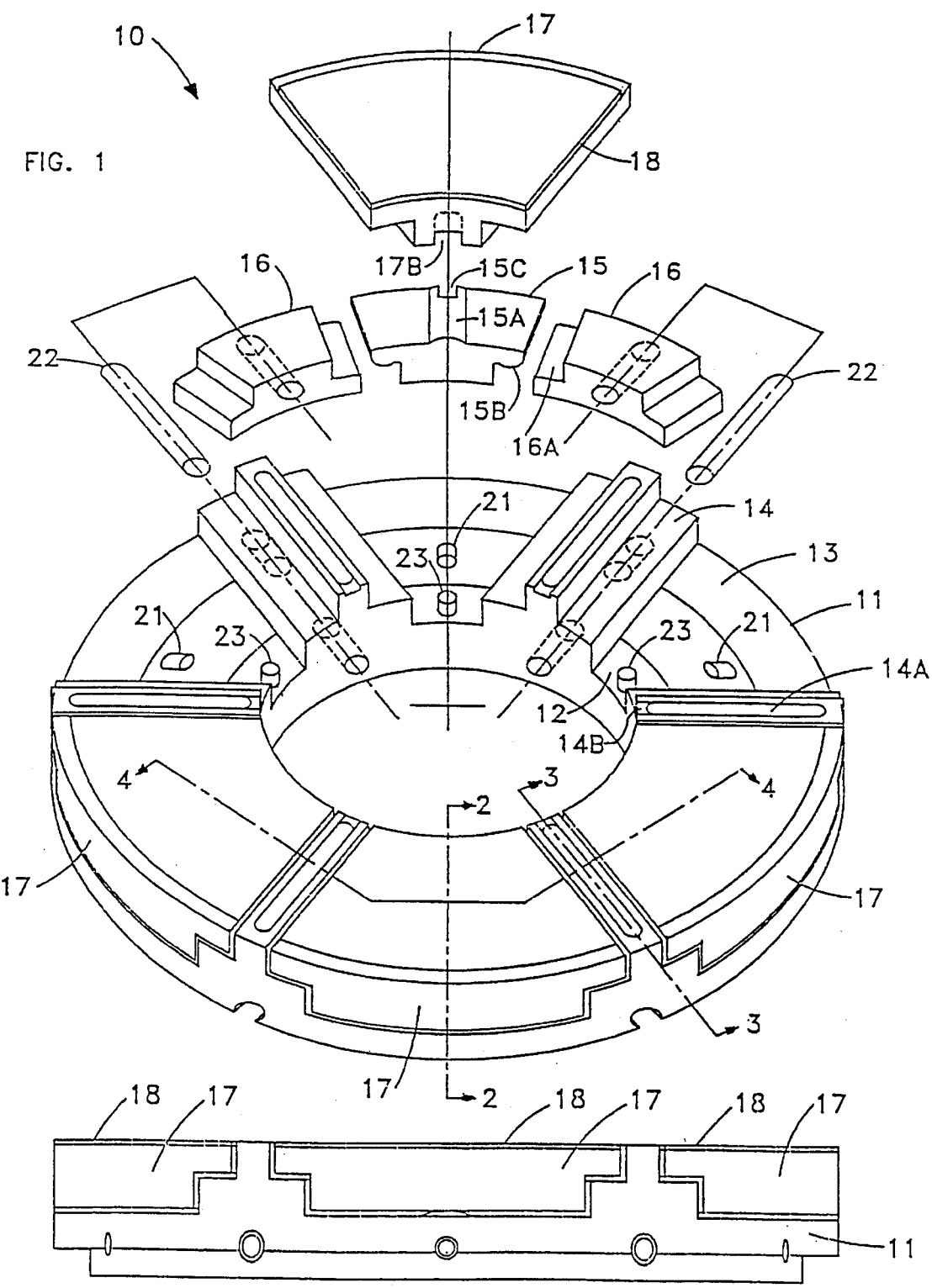
FIG. 1 is an exploded perspective view of a preferred embodiment of my improved tilting pad thrust bearing assembly.
FIG. 1A is front elevational view of the bearing assembly shown in FIG. 1.

An equalizing tilting pad thrust bearing assembly 10 is illustrated in FIGS. 1 and 1A. The assembly includes a retaining ring assembly 11 consisting of an inner ring 12 and an outer ring 13 connected by six raised radial spokes 14 on the upper face of ring assembly 11 as best shown in FIG. 1.

Rings 12 and 13 are designed to retain and position a circular array of upper equalizing links 15 and lower equalizing links 16 which support a circular array of equally spaced apart arcuate-shaped tilting pads 17.

Figure 5:
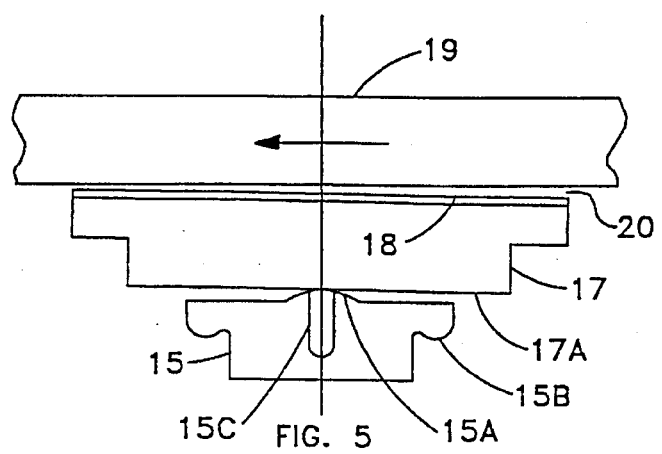
FIG. 5 is a broken away front elevational view of the rotating collar, bearing pad and upper link which illustrates the circumferential tilting of the bearing pad.
Figure 6:
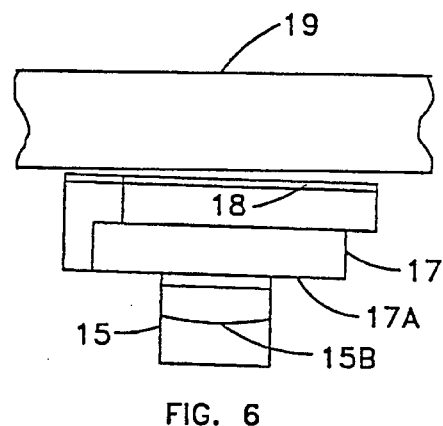
FIG. 6 is a broken away right side elevational view of the collar, bearing pad and upper link which illustrates the radial tilting of the bearing pad.

The bottom side of each tilting pad 17 has a flat surface 17A and its upper side has a flat bearing surface 18 of babbitt or other anti-friction material which supports, by hydrodynamic action when rotating, a planar collar 19 best shown in FIGS. 5 and 6. Collar 19 is attached to and lies perpendicular to a shaft (not shown) which rotates when in use.

Each upper equalizing link 15 is positioned within ring assembly 11 equally spaced in a circular array and has a raised radial cylindrical surface 15A in the center of its otherwise flat upper side. Each upper link supports a bearing pad 17 by the flat surface 17A of the pad rolling on the link's radial cylindrical surface 15A which allows the pad to tilt in a circumferential direction to develop a hydrodynamic-oil wedge 20 (shown in FIG. 5) when collar 19 is rotating.

Figure 2:
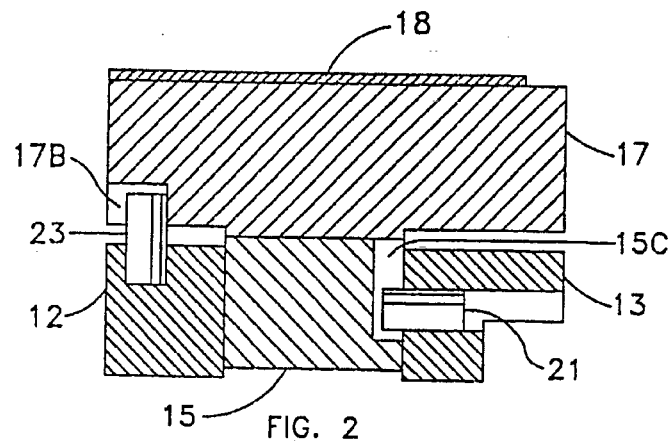
FIG. 2 is a cross-sectional view taken along line 2—2 of FIG. 1.
Figure 7:
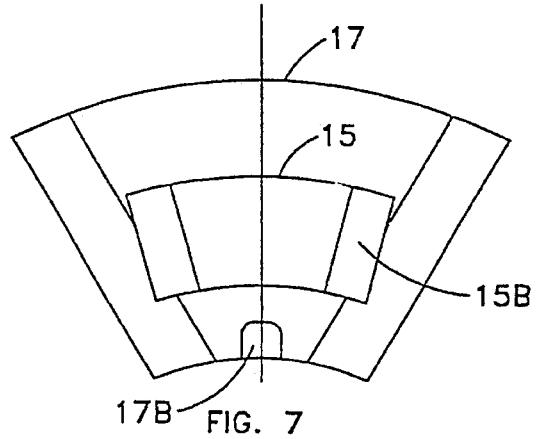
FIG. 7 is plan view taken from below of the assembly shown in FIG. 5.
Figure 8:
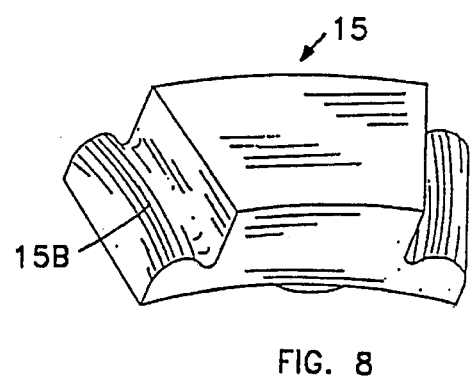
FIG. 8 is a perspective view taken from below of the bottom surface of one of the upper equalizing links shown in FIGS. 1, 2, 4, 5, 6 and 7.

Each upper equalizing link 15 also has two slightly crowned cylindrical surfaces 15B on its lower side near its opposite ends whose axes are radial making equal angles with the center of the link as best shown in FIGS. 7 and 8. Each link also has an axial slot 15C at the center of its outer diameter as best shown in FIGS. 2 and 5. Slot 15C is designed to accommodate a stub radial pin 21 which extends radially inward from the wall of outer ring 13 into slot 15C. Pin 21 positions link 15 and serves as a pivot point when the link pivots circumferentially and as a guide which allows link 15 to move toward or away from collar 19 to achieve an equalization of the thrust load between adjacent pads.

Figure 4:
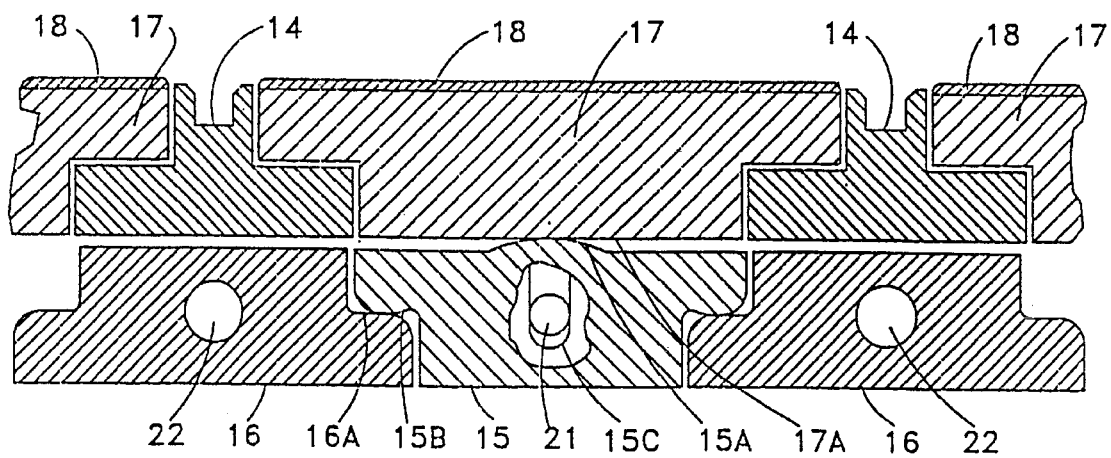
FIG. 4 is a panoramic cross-sectional view taken along line 4—4 of FIG. 1.

Lower equalizing links 16 are arranged in an equally spaced circular array between the upper equalizing links 15. Each link 16 is pivotally mounted on a radial pin 22 whose opposite ends are fixed in the walls of inner and outer rings 12 and 13. Each lower link has on its upper side a pair of similar flat surfaces 16A on its opposite ends as shown in FIGS. 1 and 4. Surfaces 16A lie in the same plane as the axis of the radial pivot pin 22 hole and which make contact with and support adjacent upper equalizing links 15 at the high point of the slightly crowned cylindrical surfaces 15B on the lower side of upper links 15. This allows the upper links 15 to tilt radially by rolling on the radius of the crown and since bearing pads 17 and upper links 15 move together in radial tilting, the bearing pads can tilt radially to compensate for any misalignment between collar 19 and bearing assembly 10 to allow for any hydrodynamic force related to radial tilting as best shown in FIG. 6.

The upper link pivot pins 21 and the lower link pivot pins 22 lie in a common plane perpendicular to the axis of the shaft attached to collar 19. Since the flat surfaces 16A of lower links 16 lie in the same plane as the axes of their radial pivot pin 22 holes, the interacting contact points between the upper and lower links must lie in the same plane as the pivot pins when the upper and lower links are in a position of zero positioning angle as taught by and claimed in my prior U.S. Pat. No. 5,046,864 and as shown in FIG. 4.

Each retaining ring spoke 14 has on its upper surface and adjacent to collar 19 a radially oriented oil distribution groove 14A whose purpose is to supply fresh lubricating oil into the oil film between bearing pads 17 and collar 19. Grooves 14A extend from near the outer edge of spoke 14 to within a small distance from the inner edge of the spoke where groove 14A connects to a shallow bleed groove 14B all as shown in FIG. 1.

Figure 3:
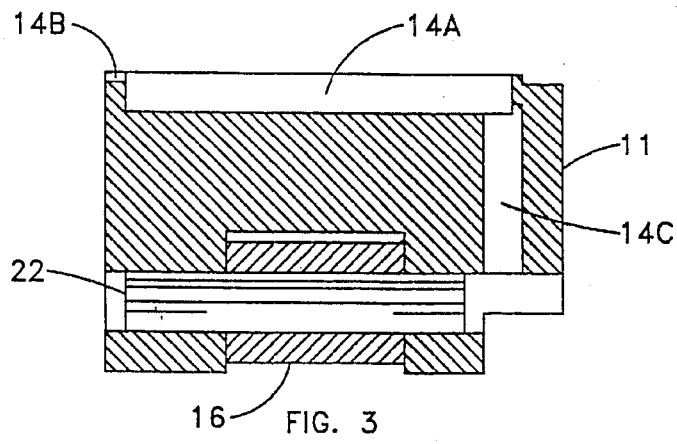
FIG. 3 is a cross-sectional view taken along line 3—3 of FIG. 1.

This arrangement prevents an excessive amount of oil to escape inwardly rather than entering the oil film. The nearly radial edges of the oil distribution grooves 14A should be chamfered or radiused to allow a smooth flow of fresh oil out of the groove and into the oil film. Oil distribution grooves 14A may be connected by a hole 14C (shown in FIG. 3) to an oil supply annulus of the type commonly used in earlier forms of tilting pad bearings.

The nearly radial edges of a bearing pad 17 might become wedged against the adjacent edge of a spoke 14 of the retaining ring assembly 11 if the bearing pad is allowed to move sufficiently inward toward the center of the ring assembly. To avoid such a lock up, an array of stub pins 23 project upwardly from the upper surface of inner ring 12. A radially oriented groove 17B on the bottom surface 17A of each tilting pad opens at the inner diameter of the pad and the groove is designed to receive a stub pin 23 and thus prevent any lock up between a tilting pad and an adjacent spoke as best shown in FIG. 2.

The vertical centerline shown in the upper portion of FIG. 1 is the centerline of the uppermost bearing pad 17 and is also the centerline of the uppermost upper equalizing link 14. This arrangement as shown in FIG. 1 is commonly referred in the trade as centered bearing thrust pad support. However, all of the novel features set forth in this application will apply if the centerline of the upper equalizing link and the lower equalizing link are offset from the centerline of the bearing pad. This condition is known in the trade as offset bearing trust pad support.

While the foregoing embodiment of my improved tilting pad thrust bearing assembly has been fully shown and described, no limitations as to the scope of my invention should be implied from this description. The true scope of my invention is limited only by the following claims.

I claim:

1. An equalizing tilting pad thrust bearing assembly comprising a plurality of similar arcuate shaped tilting pads each having flat upper and lower surfaces, a retaining ring comprising concentric inner and outer retaining rings joined together by a plurality of similar radial spokes designed to house a plurality of upper and lower equalizing links and to support the tilting pads, a plurality of upper equalizing links each having a raised radial cylindrical surface on its otherwise flat upper surface and also having a pair of downwardly facing slightly crowned radial cylinders located along the opposite ends of the link, a plurality of lower equalizing links each having a pair of flat upwardly facing surfaces located at the opposite ends of the link, a plurality of spaced apart stub pivot pins each of which is fixed in the inner wall of the outer retaining ring and extends radially to engage an axial slot in one of the upper equalizing links in order to pivotally support the upper link, and a plurality of radially oriented pivot pins whose opposite ends are fixed in the inner and outer retaining rings each designed to pivotally support one of the lower equalizing links.

2. An equalizing tilting pad thrust bearing assembly as set forth in claim 1 in which each radial spoke includes a radial groove in its upper surface designed as a channel for the flow of lubricating oil.

3. An equalizing tilting pad thrust bearing assembly as set forth in claim 1 designed so that the contact points between adjacent upper and lower equalizing links and the pivot axes of adjacent links all lie in a common plane when the equalizing links are in a position of zero pivoting angle.

* * * * *